United States Patent
Mathia et al.

(10) Patent No.: US 7,421,362 B2
(45) Date of Patent: Sep. 2, 2008

(54) METHOD FOR ANALYZING A DRIVE SYSTEM

(75) Inventors: Michel Mathia, Couvet (CH); Vincent Very, Villers-le-lac (FR)

(73) Assignee: Etel S.A., Motiers (CH)

( * ) Notice: Subject to any disclaimer, the term of this patent is extended or adjusted under 35 U.S.C. 154(b) by 378 days.

(21) Appl. No.: 10/823,525

(22) Filed: Apr. 12, 2004

(65) Prior Publication Data

US 2004/0204888 A1 Oct. 14, 2004

(30) Foreign Application Priority Data

Apr. 12, 2003 (DE) ................................ 103 16 977

(51) Int. Cl.
*G01D 3/00* (2006.01)
(52) U.S. Cl. ...................................................... 702/111
(58) Field of Classification Search .................. 702/17, 702/106, 108, 109, 111; 381/71.11; 704/226
See application file for complete search history.

(56) References Cited

U.S. PATENT DOCUMENTS

| | | | | |
|---|---|---|---|---|
| 3,483,467 A * | 12/1969 | Bates, Jr. ..................... 324/615 |
| 4,677,676 A * | 6/1987 | Eriksson ................... 381/71.11 |
| 4,953,217 A * | 8/1990 | Twiney et al. .............. 381/71.6 |
| 5,278,913 A * | 1/1994 | Delfosse et al. .......... 381/71.11 |
| 5,553,153 A | 9/1996 | Eatwell |
| 5,583,784 A * | 12/1996 | Kapust et al. .................. 702/77 |
| 5,623,402 A | 4/1997 | Johnson |
| 5,750,884 A * | 5/1998 | Field .......................... 73/54.24 |
| 2006/0050774 A1* | 3/2006 | De Marchi ................... 375/150 |

* cited by examiner

*Primary Examiner*—Bryan Bui
*Assistant Examiner*—Aditya S Bhat
(74) *Attorney, Agent, or Firm*—Kenyon & Kenyon LLP

(57) ABSTRACT

A method is for analyzing a drive system, according to which a transfer function of a target system in the drive system is determined by applying noise signals to the drive system. Several noise signals, which cover different frequency ranges, are successively applied as an input signal. In this context, the intensity of the noise signals may be optimized in steps, as a function of the covered frequency range, in order to improve the result of the identification of a target system in the drive system.

7 Claims, 3 Drawing Sheets

METHOD FOR ANALYZING A DRIVE SYSTEM

CROSS-REFERENCE TO RELATED APPLICATIONS

The present application claims priority to Application No. 103 16 977.6, filed in the Federal Republic of Germany on Apr. 12, 2003, which is expressly incorporated herein in its entirety by reference thereto.

FIELD OF THE INVENTION

The present invention relates to a method and device for analyzing a drive system. Such methods and devices are used for analyzing a target system within a drive system of a special application. For example, optimized controller parameters may be found on the basis of the analysis result.

BACKGROUND INFORMATION

The demands on modern drive systems are increasing more and more. In pick-and-place machines, e.g., smaller and smaller components must be placed more and more precisely on a printed circuit board. In this context, the number of components per unit area of a printed circuit board is increased more and more by miniaturization, so that the speed of the component positioning must constantly increase, as well, in order to maintain as high a throughput as possible at such a machine. In actuality, higher positioning accuracy and simultaneously shorter positioning times are contrary objectives, which may only be achieved by optimally parameterized loops in conjunction with high-quality motors and position-measuring systems.

However, in order to be able to set the parameters of a control loop in an optimum manner, it is important that the knowledge of the drive system is as accurate as possible. One tool for analyzing a drive system is the determination of the transfer function of the drive system or a target system within the drive system. This transfer function describes the attenuation and the phase shift experienced by a signal of a particular frequency applied to the input of the target system, up to the output. The determination of the transfer function (also known as identification) of the drive system or of the target system should be accomplished wherever applicable for the open control loop, since knowledge of the transfer function of the target system in the case of an open control loop allows one to make an assertion regarding the stability of the drive system. However, it is often not possible to open the control loop. Then, an identification must be carried out with a closed control loop. This means that, not the signal applied for test purposes, but rather the difference of the applied signal and the measured, actual value of the controlled parameter, is received at the input of the tested target system.

A conventional method for identifying a drive system is based on applying a noise signal, which contains signal portions in at least all of the frequency ranges important for the specific application, to the input of the drive system. U.S. Pat. No. 5,623,402 describes an example of such an identification. A single excitation signal is generated, which contains portions in different frequency ranges important for the application. In a complex procedure, it may be assured that the excitation signal does not contain any portions, which may lead to the destruction of the drive system, for, when a drive system is excited with noise signals, it must be taken into account that, in certain frequency ranges, considerably more intense responses (resonance) are to be expected than in other frequency ranges, which are more likely attenuated.

It is an aspect of the present invention to provide a method and device, by which the identification of a drive system may be possible in a simple manner.

The above and other beneficial aspect of the present invention may be achieved by providing a method and device as described herein.

SUMMARY

In accordance with an example embodiment of the present invention, a method is for analyzing a drive system, according to which a transfer function of a target system within the drive system is determined by applying noise signals to the drive system. In so doing, several noise signals, which cover different frequency ranges, are successively applied as an input signal.

In this context, the intensity of the noise signals may be optimized in steps, as a function of the covered frequency range, in order to improve the result of the identification of the target system in the drive system.

In accordance with an example embodiment of the present invention, a method for analyzing a drive system includes: successively applying a plurality of noise signals to the drive system as input signals, the noise signals covering different frequency ranges; and determining a transfer function of a target system within the drive system in accordance with the noise signals applied to the drive system in the applying step.

The noise signals may have different intensities.

The method may include optimizing the intensities by increasing the intensities in steps until a maximum value of a limiting parameter of the drive system is near a limiting value.

The noise signals may include noises in several frequency bands that always begin at a same lower cutoff frequency and end at a different upper cutoff frequency, and the input signal having a widest frequency band may completely cover a frequency range to be tested.

The noise signals may include one of (a) non-overlapping frequency ranges and (b) frequency ranges that overlap slightly, and the frequency ranges together may cover a frequency range to be tested.

The transfer function of the target system in an open control loop may be determined in accordance with difference signals applied to the target system and corresponding output signals.

The determining step may include evaluating a frequency-dependent attenuation and a phase shift between the difference signals and the output signals.

In accordance with an example embodiment of the present invention, a device for analyzing a drive system includes: an arrangement configured to successively apply a plurality of noise signals to the drive system as input signals, the noise signals covering different frequency ranges; and an arrangement configured to determine a transfer function of a target system within the drive system in accordance with the noise signals applied to the drive system.

In accordance with an example embodiment of the present invention, a device for analyzing a drive system may include means for successively applying a plurality of noise signals to the drive system as input signals, the noise signals covering different frequency ranges; and means for determining a transfer function of a target system within the drive system in accordance with the noise signals applied to the drive system.

Further aspects of the present invention and details pertaining thereto are derived from the following description of example embodiments, on the basis of the appended Figures.

DETAILED DESCRIPTION

Figure 1:
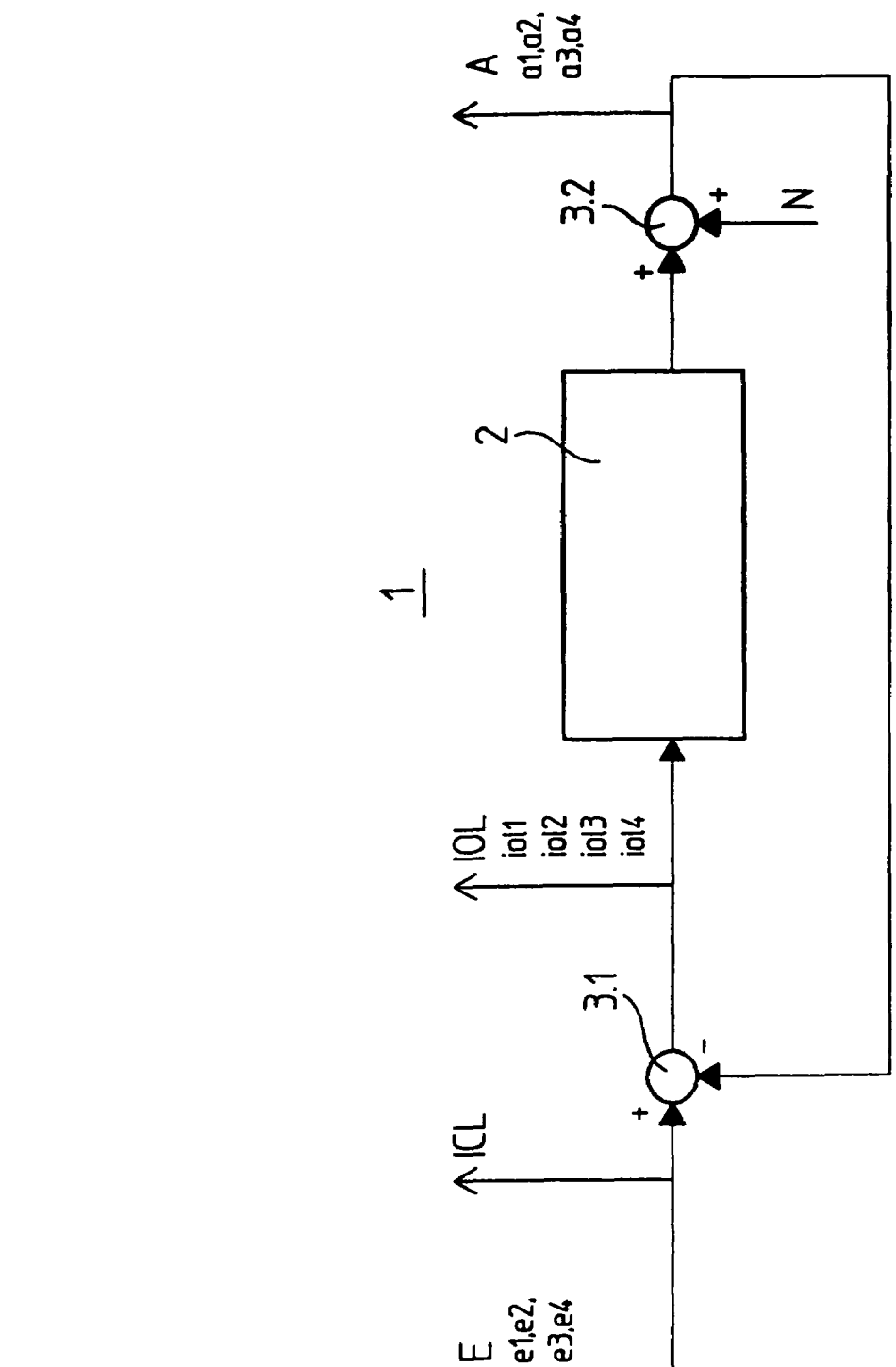
FIG. 1 illustrates a drive system having a closed control loop.

A block diagram of a drive system 1 is shown in FIG. 1 in a very general manner. In the case of a closed control loop, output signal A is subtracted from input signal E at a summing point 3.1. Difference IOL formed in this manner is transmitted to a target system 2 in drive system 1. The transfer function of target system 2 is sought. In general, the signal at the output of target system 2 may only be determined with a superimposed ambient noise N. This is indicated by a second summation point 3.2, at which ambient noise N is superimposed. The output signal A acted upon by ambient noise N is coupled back to summation point 3.1.

In a typical application, target system 2 may be made up of a cascading, closed-loop control structure of a position controller, speed controller, and current controller, which controls an electrical drive that is driven with the aid of pulse-width modulation and is connected to a moving object by a mechanism. Input signal E then corresponds to a setpoint position of the moving object. At the moving object, a position-measuring device measures the actual position and, therefore, the actual value of the object and outputs this position as output signal A. According to an exemplary embodiment, target system 2 forms, together with the closed position control loop, drive system 1. In the control loop, difference IOL represents the deviation of the actual value from the setpoint value.

If one wants to ascertain the transfer function of target system 2, he or she may plot, in a Bode diagram, the attenuation and phase shift of output signal A relative to difference signal IOL received at the input of target system 2, versus the frequency in the frequency range to be tested. Stability reserves and unstable frequency ranges of target system 2 may be seen in a conventional manner in such a Bode diagram.

The transfer function of the closed control loop may be obtained by comparing signal ICL, which corresponds to input signal E, to output signal A, in that, in this case, attenuation and phase shift are again plotted versus the frequency range to be analyzed, as well.

In the method described here, different input signals E are successively injected, and output signals A resulting from them are ascertained. When the behavior in the closed control loop is of interest, the attenuation and phase shift between input signal E and output signal A are plotted, in each instance, versus the frequency. In the analysis of the transfer function of target system 2 in the open control loop, the attenuation and phase shift between difference IOL and output signal A are plotted versus the frequency.

Figure 2:
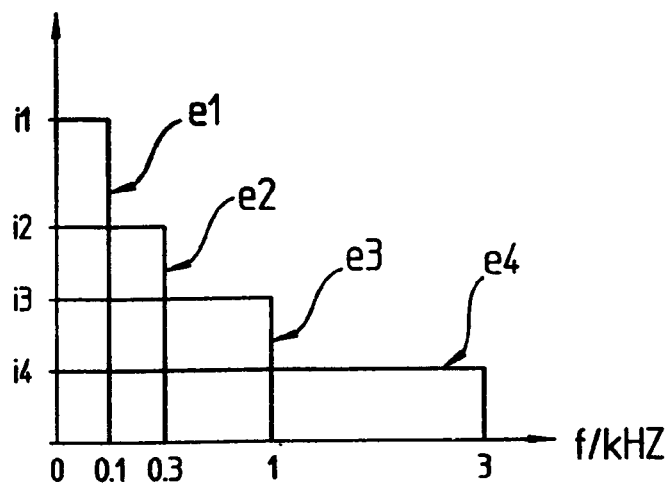
FIG. 2 illustrates noise signals in a first variant.

As shown in FIG. 2, noise signals e1 through e4 having different frequency ranges are used as input signals E. In a typical application, a frequency range of 0 kHz to 3 kHz is of interest. In order to take into account that, in the present example, the attenuation of input signal E up to difference signal (IOL) at the input of target system 2 is, in the case of low frequencies, greater than in the case of high frequencies (high-pass behavior), one may select intensity i1 to i4 of noise signals e1 to e4, which only contain low frequency portions or fractions, to be greater than intensity i1 to i4 of noise signals e1 to e4, which contain higher frequency portions. Thus, intensity i1 of noise signal e1, which only contains frequencies between 0 kHz and 0.1 kHz, is considerably greater than intensity i4 of noise signal e4, which contains frequencies between 0 kHz and 3 kHz.

Figure 3:
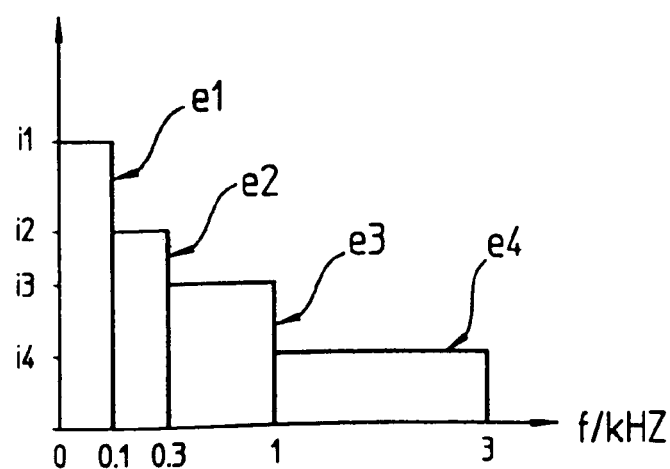
FIG. 3 illustrates noise signals in a second variant.

FIG. 3 shows an alternative manner of dividing up the frequency ranges, according to which the frequency range of interest is divided up into non-overlapping frequency bands or frequency bands that only overlap slightly. Noise signal e1, which covers a low frequency range, again receives a higher intensity i1 than noise signal e4, which covers a high frequency range.

The number of noise signals e1 to e4, as well as the covered frequency range and the individual cutoff frequencies, are only to be understood as an example and may be adapted to the specific application. In addition, it is possible to divide up the individual frequency ranges of noise signals e1 to e4 in an irregular manner, in which they partially overlap.

The intensity distribution may also become reversed for the identification of other target systems 2 within drive system 1, where input signal E is subjected to low-pass filtering up to the input of target system 2. In FIG. 3, noise signal e4 may then have highest intensity i4 in the highest frequency range, and noise signal e1 may have lowest intensity i1 in the lowest frequency range. If, for instance, the mechanical coupling of the moving object to the electrical drive is investigated as target system 2, then the signal applied to target system 2, namely the force exerted by the electrical drive, is usually subjected to low-pass filtering with respect to signal E applied to the input of drive system 1.

In general, noise signals e1 to e4, which are more sharply attenuated from the input of drive system 1 up to the input of target system 2, may be applied to drive system 1 at a higher intensity. This may improve the spacing or separation of output signal of target system 2 from ambient noise N.

Intensity i1 to i4 of individual noise signals e1 to e4 may not be too low, in order to ensure adequate separation of specific output signals a1 to a4 from ambient noise N. On the other hand, intensity i1 to i4 may also not be selected to be arbitrarily high, since different parameters are limited in target system 2. In the described example, these may include, for instance, a maximum current in the electrical drive and a maximum speed of the moving object.

Thus, a method for stipulating intensity i1 to i4 of noise signals e1 to e4 is described. Based on the exemplary stipulation that the current in the drive should reach a maximum of 60% of its saturation value and the maximum speed should be, at the most, 80% of the allowed speed, corresponding limit values Climit and Vlimit are established for the current and the speed.

Figure 4:
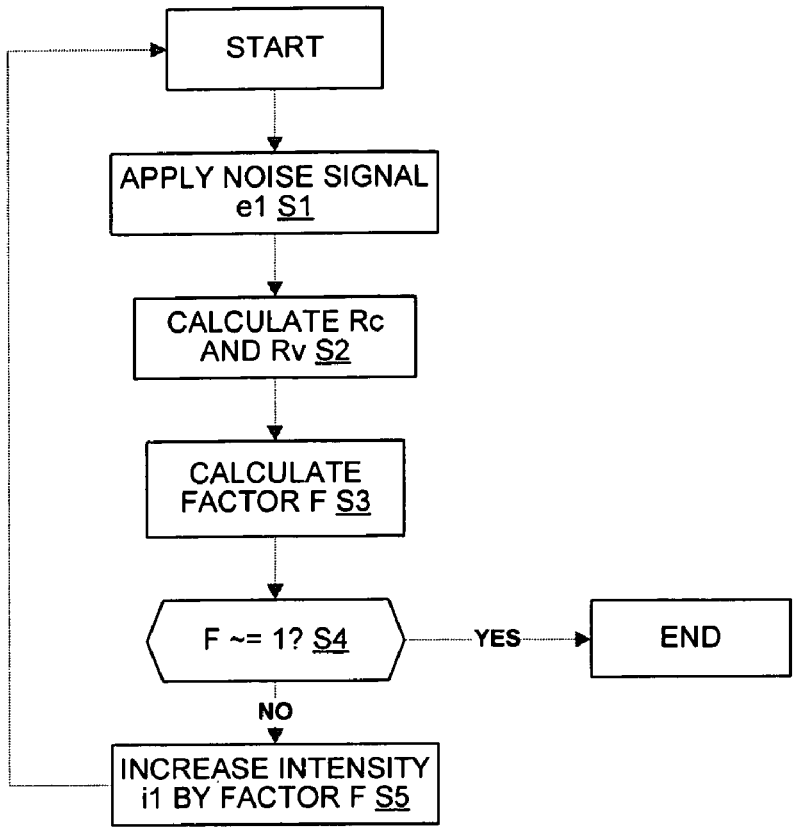
FIG. 4 illustrates method steps for stipulating the intensity of the noise signals.

A method for stipulating intensity i1 for first noise signal e1 is now described with the aid of FIG. 4, the method being representative of all further noise signals e2 to e4.

In first step S1, noise signal e1 is applied for a certain period of time (e.g., 500 ms) as input signal E. In this context, maximum values Cmax and Vmax of the current and the speed occurring during this time are measured. Intensity i1 of noise signal e1 is initially selected to be so low, that it is certain that none of limiting values Climit and Vlimit is reached, i.e.:

Cmax<<Climit;

and:

Vmax<<Vlimit.

In second step S2, ratios:

$$Rc = Climit/Cmax;$$

and $$Rv = Vlimit/Vmax$$

are calculated. The greater the ratio, the further away the maximum occurring current value or speed value (Cmax or Vmax) lies from its limiting value (Climit or Vlimit).

In a third step S3, a factor F corresponding to the lesser of the two ratios Rc and Rv is determined:

$$F = min(Rc, Rv)$$

In a fourth step S4, it is checked if factor F is approximately one. Since this means that one of the two values Cmax or Vmax has approximately reached its limiting value Climit or Vlimit, the method for stipulating intensity i1 of noise signal e1 is terminated here.

But, if the factor is still considerably greater than one, intensity i1 is increased by this factor F in a fifth step S5:

$$i1 := i1 * F$$

With this increased intensity i1, the method branches off to first step S1 again and is started anew. In this manner, intensity i1 approaches an optimized value step-by-step, where maximum value Cmax, Vmax of one of the limiting parameters, current and speed, comes close to its limiting value, Climit or Vlimit. In this context, one assumes that intensity i1 of noise signal e1 and respective maximum value Cmax or Vmax behave approximately linearly. Since this assumption may not be correct for factors F of any size desired, it is useful to limit factor F in fifth step S5. An example of a sensible value may be a maximum factor F of five.

Intensities i2 to i4 of remaining noise signals e2 to e4 are iteratively optimized in an analogous manner.

Other or additional, available parameters of target system 2 are also considered as limiting parameters. It may only be important that, in each instance, lowest ratio Rc, Rv is determined in step S3, in order to prevent factor F from becoming too large. In addition, the optimization is also possible, using only one limiting parameter. One may also work with reciprocals of above-defined ratios Rc, Rv. Then, the greater of the two values may be used as factor F, and, in each instance, intensity i1 to i4 of noise signals e1 to e4 is increased by factor 1/F for the next iteration step.

For the identification of target system 2, several noise signals e1 to e4, which cover different frequency ranges and have different, optimized intensities i1 to i4, are now successively applied to target system 2 as input signal E. In this context, respective output signals a1 to a4 are measured. The sequential application of noise signals e1 to e4 allows intensity i1 to i4 to be higher in the individual frequency ranges than in the case of an identification, which may cover all of the frequencies with the aid of a single input signal, may be conventional. This may increase the accuracy of the identification.

On the basis of the superposition principal, all noise signals e1 to e4 and all respective, obtained output signals a1 to a4 may then be added:

$$E = e1 + e2 + e3 + e4;$$

and:

$$A = a1 + a2 + a3 + a4.$$

The Bode diagram sought for the identification of target system 2 in the closed control loop may be ascertained from the frequency-specific phase shift and attenuation between input signal E calculated in this manner and output signal A.

For the identification of target system 2 in the open control loop, difference signal iol1 to iol4 is ascertained for each noise signal e1 to e4, and the following sum is formed:

$$IOL = iol1 + iol2 + iol3 + iol4$$

The Bode diagram sought is again ascertained from the phase shift and attenuation between IOL and A.

Therefore, in the described method, E, IOL, and A are not directly determined by an experiment, but are calculated by superposing several noise signals e1 to e4 or difference signals iol1 to iol4 and several corresponding output signals a1 to a4.

An alternative manner of identifying target system 2 is to generate, for the identification in the closed control loop, the Bode diagrams for each noise signal e1 to e4 (or difference signals iol1 to iol4) and corresponding output signal a1 to a4.

A combined Bode diagram is then generated, in which only a part of the frequency range is used from each Bode diagram for one of noise signals e1 to e4. Thus, according to FIG. 2 or FIG. 3, only the frequency range of 0 Hz to 100 Hz of the corresponding Bode diagram is used for noise signal e1, and the frequency range of 100 Hz to 300 Hz of the Bode diagram is associated with noise signal e2. The Bode diagrams of noise signals e3 and e4 supply the ranges of 300 Hz to 1 kHz and 1 kHz to 3 kHz, respectively. The Bode diagram assembled in this manner then covers the investigated frequency range completely.

As aspect of the described method is that noise signals e1 to e4, which have frequency portions that are subjected to considerable attenuation up to target system 2, may be injected at a higher intensity i1 to i4. In these ranges, the identification of target system 2 may then be more accurate than in the method, in which only one noise signal e1 to e4 is used, which covers the entire frequency range to be tested and, in so doing, may not trigger any limiting-value violation in target system 2.

Figure 5:
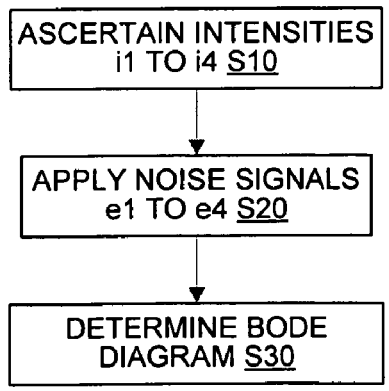
FIG. 5 illustrates a method for analyzing a drive system.

To sum up, the method for identifying target system 2 is described again with the aid of FIG. 5.

Intensities i1 to i4, at which noise signals e1 to e4 may be applied, respectively, as input signal E, are ascertained in a stipulation step S10, so that none of the limiting parameters, such as current or speed, exceeds its respective limiting value Climit or Vlimit. A simple method for this was described on the basis of FIG. 4. In this context, noise signals e1 to e4 each cover different frequency ranges by themselves. Together, noise signals e1 to e4 cover the frequency range to be tested.

In an ascertainment step S20, noise signals e1 to e4 are successively applied as input signals E at intensities i1 to i4 determined in step 10, and, in the process, respective output signals a1 to a4 are measured. If the behavior of target system 2 is tested in the case of an open control loop, then each difference signal iol1 to iol4 is additionally measured.

In this context, steps S10 and S20 may initially be executed one after the other for e1/i1, then for e2/i2, e3/i3, and e4/i4, or, as an alternative, S10 may initially be executed for all noise signals e1 to e4, and then S20 may be executed for all noise signals e1 to e4, at intensities i1 to i4 determined in step S10. In each case, S20 is ended for all noise signals e1 to e4, before the method can branch off to step S30.

In identification step S30, the Bode diagram of the target system in the closed or open control loop is now determined from noise signals e1 to e4 or difference signals iol1 to iol4, and from output signals a1 to a4. In this context, either the sum of all noise signals e1 to e4 or the sum of all difference signals iol1 to iol4, and the sum of all output signals a1 to a4, may be considered on the basis of the superposition principle, or a separate Bode diagram may be ascertained for each applied noise signal e1 to e4. As explained above, the individual Bode diagrams may then be split up into frequency ranges and joined to form a combined Bode diagram, which completely covers the frequency range to be tested.

Using the Bode diagram for target system 2 in the open control loop, e.g., the stability of tested drive system 1 may now be assessed, and, if necessary, the controller parameters in target system 2 may be optimized.

The method of identification may be suitable for a wide variety of target systems 2. In each instance, it only may be ensured that the signals at the input and at the output of the target system, as well as the limiting parameters, are measurable.

What is claimed is:

1. A method for analyzing a drive system by determining an open loop transfer function of a target system that is part of the drive system in a closed loop configuration, comprising:
   successively applying a plurality of noise signals to the drive system as input signals, the noise signals covering different frequency ranges; and
   determining a transfer function of a target system within the drive system in accordance with the noise signals applied to the drive system in the applying step;
   wherein the transfer function of the target system in an open control loop is determined in accordance with difference signals applied to the target system and corresponding output signals; and
   wherein the determining step includes evaluating a frequency-dependent attenuation and a phase shift between the difference signals and the output signals.

2. The method according to claim 1, wherein the noise signals have different intensities.

3. The method according to claim 2, further comprising optimizing the intensities by increasing the intensities in steps until a maximum value of a limiting parameter of the drive system is near a limiting value.

4. A method for analyzing a drive system, comprising:
   successively applying a plurality of noise signals to the drive system as input signals, the noise signals covering different frequency ranges; and
   determining a transfer function of a target system within the drive system in accordance with the noise signals applied to the drive system in the applying step;
   wherein the noise signals include noises in several frequency bands that always begin at a same lower cutoff frequency and end at a different upper cutoff frequency, the input signal having a widest frequency band completely covering a frequency range to be tested.

5. The method according to claim 1,
   wherein the noise signals include one of (a) non-overlapping frequency ranges and (b) frequency ranges that overlap slightly, the frequency ranges together covering a frequency range to be tested.

6. A device for analyzing a drive system by determining an open loop transfer function of a target system that is part of the drive system in a closed loop configuration, comprising:
   an arrangement configured to successively apply a plurality of noise signals to the drive system as input signals, the noise signals covering different frequency ranges; and
   an arrangement configured to determine a transfer function of a target system within the drive system in accordance with the noise signals applied to the drive system, the transfer function of the target system in an open control loop determined in accordance with difference signals applied to the target system and corresponding output signals, the determination including an evaluation of a frequency-dependent attenuation and a phase shift between the difference signals and the output signals.

7. A device for analyzing a drive system by determining an open loop transfer function of a target system that is part of the drive system in a closed loop configuration, comprising:
   means for successively applying a plurality of noise signals to the drive system as input signals, the noise signals covering different frequency ranges; and
   means for determining a transfer function of a target system within the drive system in accordance with the noise signals applied to the drive system;
   wherein the transfer function of the target system in an open control loop is determined by the determining means in accordance with difference signals applied to the target system and corresponding output signals; and
   wherein the determining includes evaluating a frequency-dependent attenuation and a phase shift between the difference signals and the output signals.

* * * * *